(12) United States Patent
Kamiyama et al.

(10) Patent No.: US 8,360,684 B2
(45) Date of Patent: Jan. 29, 2013

(54) METHOD FOR LINKING SEGMENTS AND LINKING TOOL

(75) Inventors: Takao Kamiyama, Hiratsuka (JP); Koji Kaneta, Hiratsuka (JP); Kenji Fujii, Hiratsuka (JP); Katsuyori Miura, Hiratsuka (JP)

(73) Assignee: Shonan Gosei-Jushi Seisakusko K.K. (JP)

( * ) Notice: Subject to any disclaimer, the term of this patent is extended or adjusted under 35 U.S.C. 154(b) by 677 days.

(21) Appl. No.: 12/589,140

(22) Filed: Oct. 19, 2009

(65) Prior Publication Data
US 2010/0101674 A1    Apr. 29, 2010

(30) Foreign Application Priority Data

Oct. 23, 2008   (JP) ................................ 2008-272591

(51) Int. Cl.
*F16L 55/163*    (2006.01)
(52) U.S. Cl. ............ 405/135; 405/153; 138/97; 138/98
(58) Field of Classification Search .................... 138/97, 138/98; 405/151, 153, 152, 157, 150.1, 134, 405/135, 177
See application file for complete search history.

(56) References Cited

U.S. PATENT DOCUMENTS

| | | | | |
|---|---|---|---|---|
| 2,015,102 A | * | 9/1935 | Doig | 405/152 |
| 2,084,952 A | * | 6/1937 | Field | 220/243 |
| 4,477,204 A | * | 10/1984 | Rohde et al. | 405/153 |
| 4,830,536 A | * | 5/1989 | Birch et al. | 405/153 |
| 6,616,377 B1 | * | 9/2003 | Smith et al. | 405/135 |
| 7,341,280 B2 | * | 3/2008 | Kamiyama et al. | 285/15 |
| 8,240,339 B2 | * | 8/2012 | Kamiyama et al. | 138/98 |

* cited by examiner

*Primary Examiner* — James Hook
(74) *Attorney, Agent, or Firm* — Adams & Wilks

(57) ABSTRACT

A linking tool links segments for a rehabilitating pipe for rehabilitating an existing pipeline. The segment is integrally formed at least from an internal surface plate that constitutes the inner circumferential surface of the rehabilitating pipe, and side plates that have an insertion hole formed thereon and are disposed on both sides of the internal surface plate so as to extend in the circumferential direction of the rehabilitating pipe. The linking tool includes a tubular linking pin that is separable into pin halves and can be inserted into the insertion hole in the side plate of a first segment with a part of the linking pin remaining outside the first segment. The linking tool further includes a separating pin that can be inserted into the linking pin to separate the linking pin into the pin halves and press them against the first segment for anchoring thereto. The pin halves remaining outside the first segment are snap-fitted into a second segment through the insertion hole of the side plate thereof, thereby linking the first and second segments in the longitudinal direction of the rehabilitating pipe. Such a linking tool allows the segments to be efficiently linked in a short period of time.

10 Claims, 14 Drawing Sheets

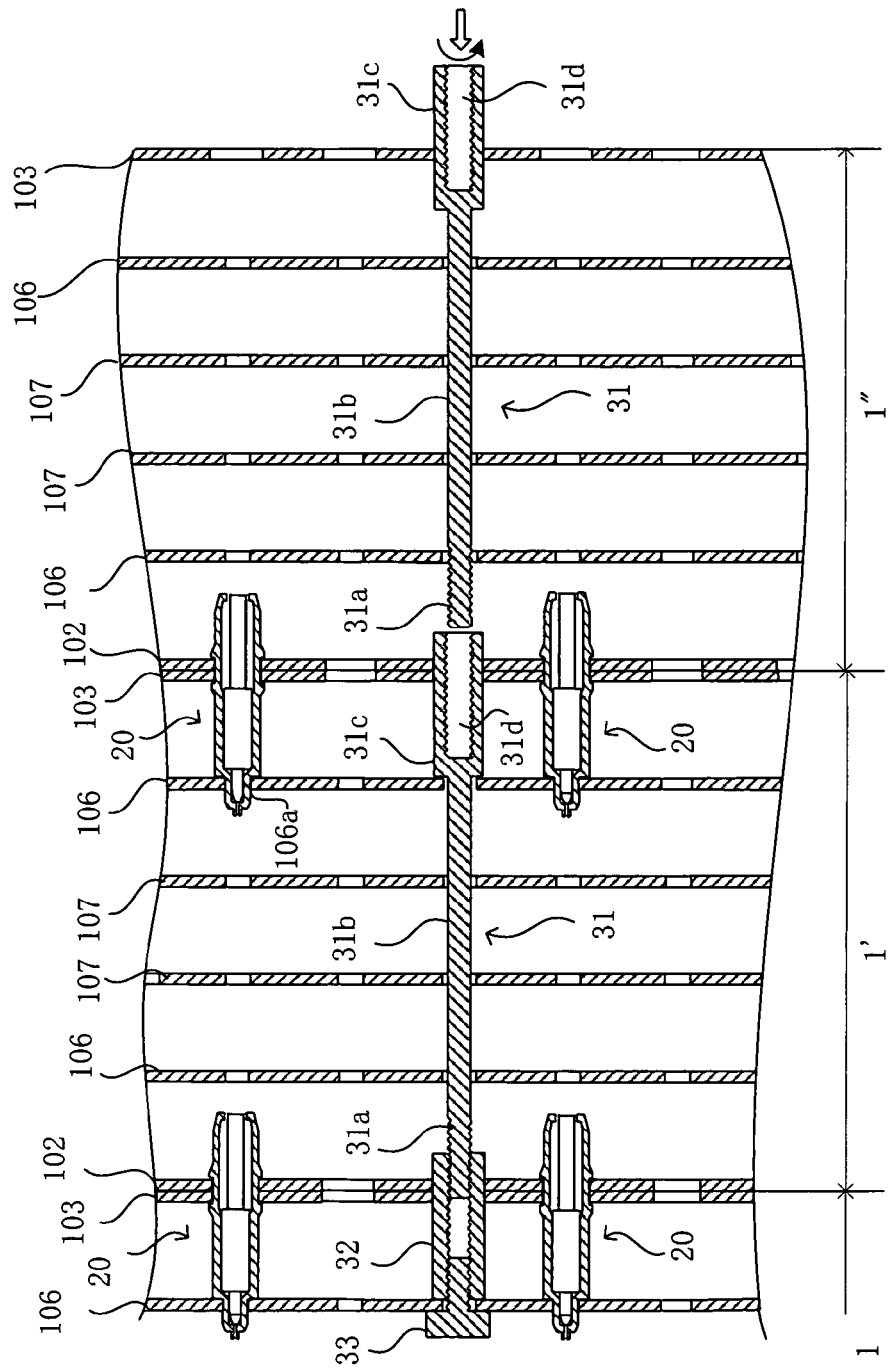

_METHOD FOR LINKING SEGMENTS AND LINKING TOOL_

BACKGROUND OF THE INVENTION

1. Field of the Invention

The present invention relates to a method for linking segments and a linking tool, and more particularly to a method for linking segments that are used as an assembly unit of a pipe for rehabilitating existing pipes or pipelines, and to a linking tool used in this method.

2. Description of the Related Art

In cases where sewage pipes or other pipelines that are buried underground have aged, methods for constructing a pipe lining have already been proposed and are being employed in practical applications.

With the aforementioned methods for constructing a pipe lining, a pipe-lining material, which is formed, e.g., by impregnating a tubular resin-adsorbent material with an uncured thermosetting resin, is inserted into a pipeline via fluid pressure while being everted, and the impregnated thermosetting resin is cured by heating the pipe-lining material in the state where the pipe-lining material is pressed against the inner circumferential wall of the pipeline by fluid pressure. This allows a plastic pipe to be installed within the pipeline to be repaired.

In another well-known method for repairing a pipeline using a rehabilitating pipe (Japanese Laid-open Patent Application Nos. 2003-286742 and 2005-299711), a segment made of a plastic material is used which is integrally composed of an internal surface plate that constitutes the inner circumferential surface of the rehabilitating pipe and an outer-wall plate that is vertically disposed on the peripheral edges of the internal surface plate. Segments are linked in the circumferential direction to assemble pipe units, which are then linked in the longitudinal direction of the pipe via a linking member to assemble the rehabilitating pipe. This method is used for large-bore pipelines.

When linked together in the longitudinal direction of the pipe as disclosed in Japanese Laid-open Patent Application Nos. 2003-286742 and 2005-299711, the segments are linked using a linking tool provided with a screw. A screw-fastening tool is therefore necessary, and time is required to tighten the screw. The screw may not be able to be turned when the operation is performed in confined spaces; moreover, the operation is troublesome and repetitive even when the screw can be turned. A significant burden is therefore placed on the worker, resulting in lengthened operational time.

SUMMARY OF THE INVENTION

It is therefore an object of the present invention to provide a method for linking segments, and a linking tool, whereby segments can be efficiently linked in the longitudinal direction of the pipe in a short period of time using a simple method.

The present invention provides a method for linking segments for a rehabilitating pipe for rehabilitating an existing pipeline. The segment is integrally formed at least from an internal surface plate that constitutes the inner circumferential surface of the rehabilitating pipe, and side plates that have an insertion hole formed thereon and are disposed on both sides of the internal surface plate so as to extend in the circumferential direction of the rehabilitating pipe. The method for linking the segments comprises the steps of preparing a linking pin that can be separated into pin halves by a separating pin; inserting the linking pin into the insertion hole in the side plate of a first segment with a part of the linking pin remaining outside the first segment; separating the linking pin into the pin halves by the separating pin, the separated pin halves being pressed against the first segment, thereby anchoring the pin halves to the first segment; and snap-fitting the pin halves remaining outside the first segment into a second segment through the insertion hole of the side plate thereof, thereby linking the first and second segments in the longitudinal direction of the rehabilitating pipe.

A linking tool according to the present invention comprises a tubular linking pin that is separable into pin halves and can be inserted into the insertion hole in the side plate of a first segment with a part of the linking pin remaining outside the first segment; and a separating pin that can be inserted into the tubular linking pin to separate the linking pin into the pin halves and press them against the first segment for anchoring thereto. The pin halves remaining outside the first segment are snap-fitted into a second segment through the insertion hole of the side plate thereof, thereby linking the first and second segments in the longitudinal direction of the rehabilitating pipe.

According to the present invention, a linking pin, which is inserted into the insertion hole of the side plate of a segment, is separated into pin halves by a separating pin. The pin halves are pressed against the segment, thereby anchoring the linking pin to the segment. The other end of the linking pin outside the segment is snap-fitted into another segment, allowing the two segments to be linked in the longitudinal direction of the rehabilitating pipe. Screw-fastening is therefore unnecessary, and the segments can be assembled in confined spaces where a manual screwing motion is difficult to perform. The assembly operation can be simplified and shortened even during assembly in open spaces. Excellent effects are obtained in that construction time is shortened, the burden on workers is lightened, and the number of workers required is reduced even during a construction work for assembling a rehabilitating pipe using the segments to repair an existing pipeline.

Further features of the invention, its nature and various advantages will be more apparent from the accompanying drawings and following detailed description of the invention.

BRIEF DESCRIPTION OF THE DRAWINGS

FIG. 8d is a cross-sectional view in which the separating pin has been pushed further in;

FIG. 10 is a cross-sectional view along a segment arc, in which segments are linked in the longitudinal direction of the pipe via the linking tool and the linking rod;

DESCRIPTION OF THE PREFERRED EMBODIMENTS

The present invention will be described in detail hereinafter on the basis of the embodiments shown in the accompanying drawings.

Figure 1:
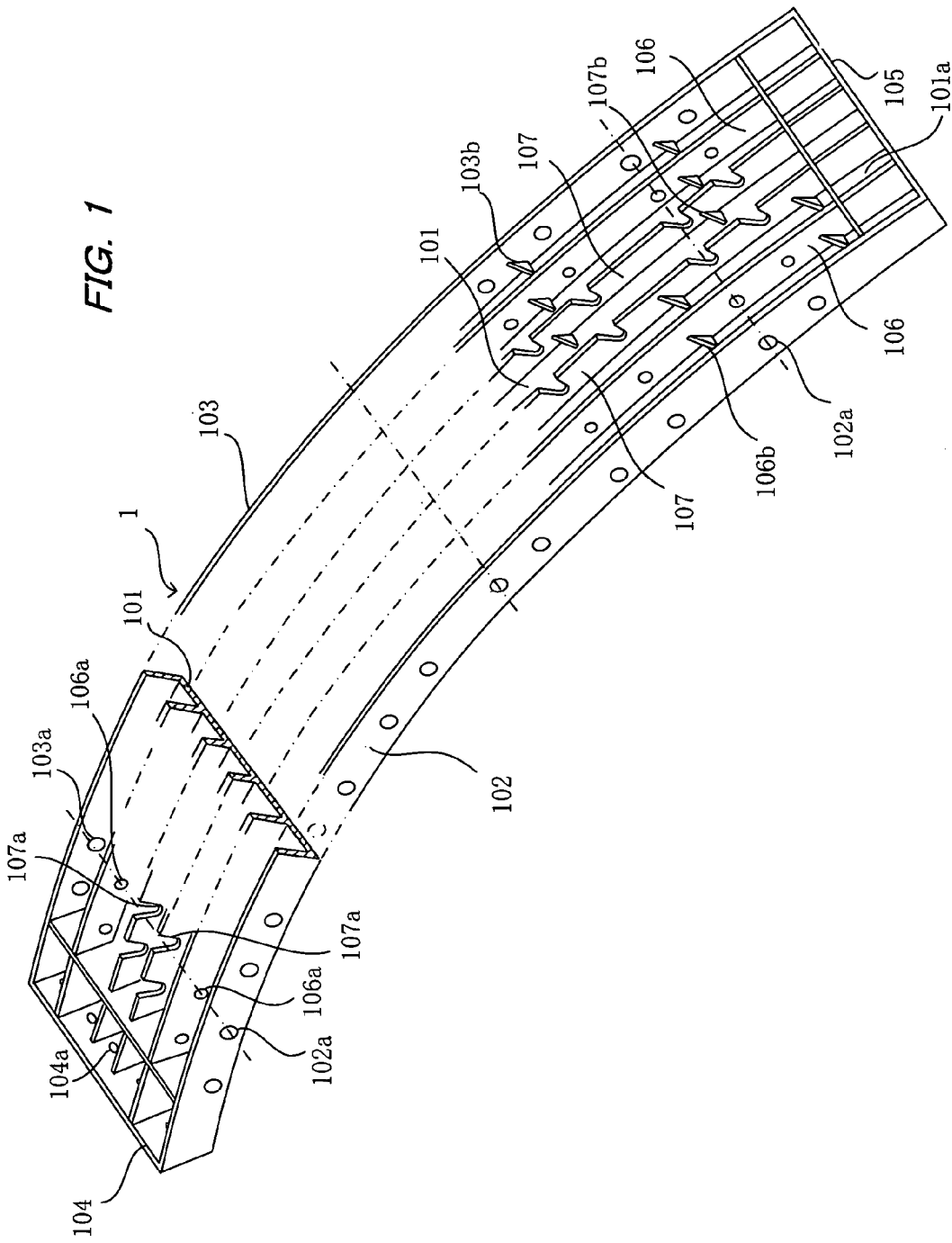
FIG. 1 is a perspective view of a segment shown partially broken and partially in cross-section.

FIG. 1 shows a segment 1 that serves as an assembly unit for a pipe for rehabilitating an existing pipe such as a sewerage pipe, a waterworks pipe, an agricultural water pipe and the like. The segment 1 is a block-shaped member that is integrally formed of plastic from an internal surface plate 101 that constitutes an inner circumferential surface of the rehabilitating pipe; side plates 102, 103 that are vertically disposed at both sides of the internal surface plate 101 so as to extend in the circumferential direction of the rehabilitating pipe; and end plates 104, 105 that are vertically disposed at both ends of the internal surface plate 101 so as to extend in the longitudinal direction of the pipe. The side plates 102, 103 and the end plates 104, 105 of the segment 1 have the same height and form an outer-wall plate that surrounds the rim of the internal surface plate 101 on all four sides. The widths (thicknesses) of the side plates 102, 103 of the segment 1 in the longitudinal direction of the pipe have the same value. The segment 1 has a shape bent into an arc shape of a predetermined angle that divides the circumference of a circle into a plurality of equal parts, e.g., five equal parts of 72 degrees each. The segment is not limited to arc or fan shapes, however, and may also be another shape, such as a bent shape obtained by rounding off a cuboid or right angle, in accordance with the shape of the cross-section of the existing pipe, the size thereof, and the location of the existing pipe to be repaired.

A plurality of internal plates (reinforcement plates) 106, 107 that are similar to the side plates are provided vertically on the upper surface of the internal surface plate 101 inside the side plates 102, 103 in order to reinforce the mechanical strength of the segment 1. Convex plates 103b, 106b, 107b that project laterally are formed at a plurality of locations on both lateral surfaces of the internal plates 106, 107 and the inner lateral surfaces of the side plates 102, 103 in order to prevent deformations thereof, resulting in a ribbed structure and increasing the strength of the segment 1.

A plurality of circular or substantially circular insertion holes 102a, 103a are formed in the circumferential direction at equal intervals on the side plates 102, 103 so that a linking tool can be inserted. The linking tool links the segments in the longitudinal direction of the pipe, as described hereinafter. A plurality of circular or substantially circular insertion holes 106a for inserting the linking tool are also formed in the internal plates 106 in positions corresponding to the insertion holes 102a, 103a of the side plates 102, 103 when viewed in the longitudinal direction of the pipe. The diameter of the insertion holes 106a is smaller than the diameter of the insertion holes 102a, 103a, as described hereinafter. A plurality of notches 107a are formed on the internal plates 107 in positions that correspond to the respective insertion holes 102a, 103a of the side plates 102, 103.

The internal surface plate 101, the side plates 102, 103, the end plates 104, 105, as well as the internal plates 106, 107 and the convex plates that function as reinforcement plates for these parts, are all made of the same clear, translucent, or opaque plastic and are formed integrally using well-known molding techniques.

A plurality of rectangular opening parts 101a are formed on the ends of the internal surface plate 101 on the sides having the end plates 104, 105 so that the operation for linking the segments 1 in the circumferential direction can be performed from the inside.

Figure 2:
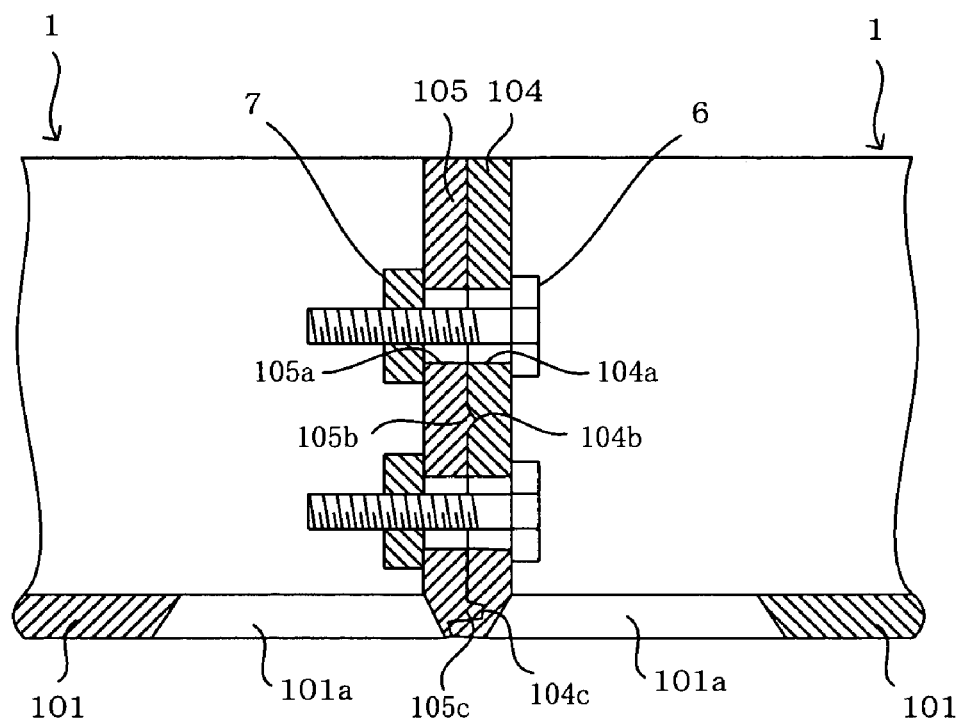
FIG. 2 is a perpendicular cross-sectional view of two segments, as seen when both segments are linked in the circumferential direction.

The segments 1 are linked in the circumferential direction by bringing the outer surfaces of the end plates 104 and 105 of each of the segments 1 in close contact with one another, inserting bolts 6 into insertion holes 104a, 105a from the opening parts 101a of the internal surface plate 101, threading on nuts 7, and fastening together both of the end plates 104, 105, as shown in FIG. 2. Concave parts 104b, 104c and convex parts 105b, 105c for fitting to the respective concave parts 104b, 104c are formed across the entire length of the end plates 104 and 105 in the longitudinal direction of the pipe. Both segments can therefore be readily held in position and brought into close contact during the linking operation. A sealant (not shown) is applied to the parts to be fit, whereby the water-tightness of the linking parts can be increased.

Once the linkage of the segments 1 in the circumferential direction is completed, the opening parts 101a are sealed shut using a lid (not shown) or the like. The bottom surface of the lid in such instances is continuous with the bottom surface of the internal surface plates 101, and the inner surfaces (the surfaces facing the center of the pipe) of the internal surface plates 101 form a uniform surface.

Figure 3:
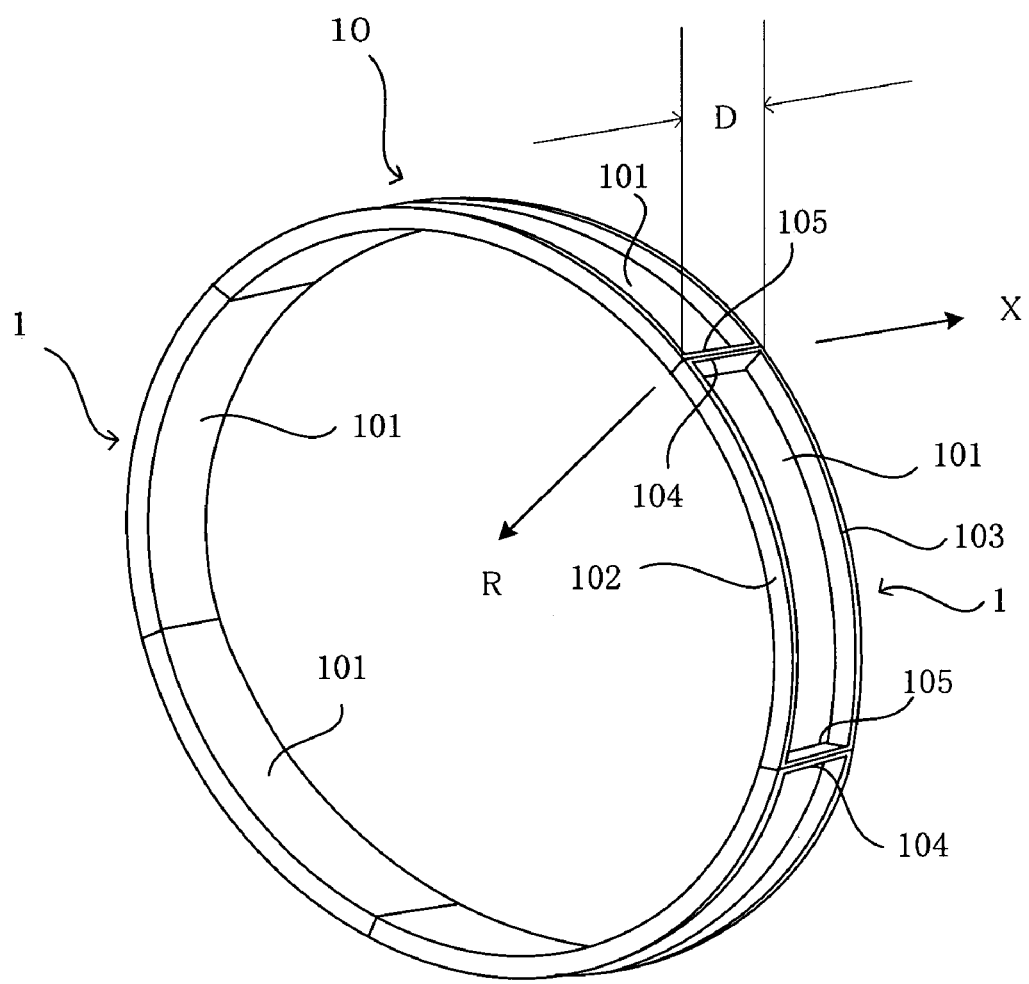
FIG. 3 is a perspective view of a pipe unit wherein the segments are linked in the circumferential direction to provide the pipe unit.

The segments 1 are linked in the circumferential direction so that the inner surfaces of the internal surface plates 101 form a uniform surface, and so that the outer surfaces of the respective side plates 102, 103 all form a single surface. A closed, ring-shaped pipe body 10 (referred to as a pipe unit hereinafter) having a short, predetermined length can therefore be assembled when the segments 1 are sequentially linked in the circumferential direction, as shown in FIG. 3. The pipe unit 10 has a shape obtained by cutting a round pipe perpendicularly with respect to the longitudinal direction X thereof with a predetermined width D. The outside diameter of the pipe unit is smaller than the inside diameter of the existing pipeline to be repaired. The segments 1 correspond to the members that are obtained when the pipe unit 10 is cut along a radial direction R and divided into a plurality of pieces (five in the embodiment in the drawings).

The internal surface plates 101, the side plates 102, 103, and the end plates 104, 105, which are the primary structural members of the segment, are shown in FIG. 3. The internal plates 106, 107, the convex plates, other reinforcing structures, the insertion holes 102a, 103a, and the like are omitted from FIG. 3 in order to avoid complexity.

Figure 4A:
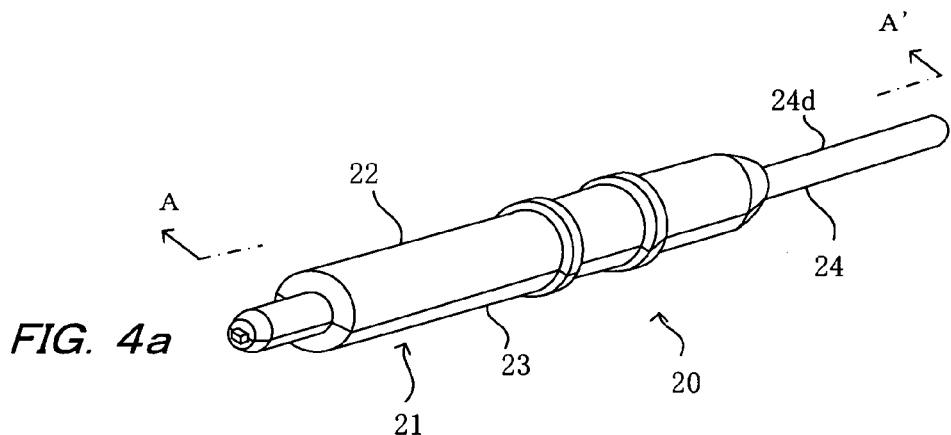
FIG. 4a is a perspective view of a linking tool.
Figure 4B:
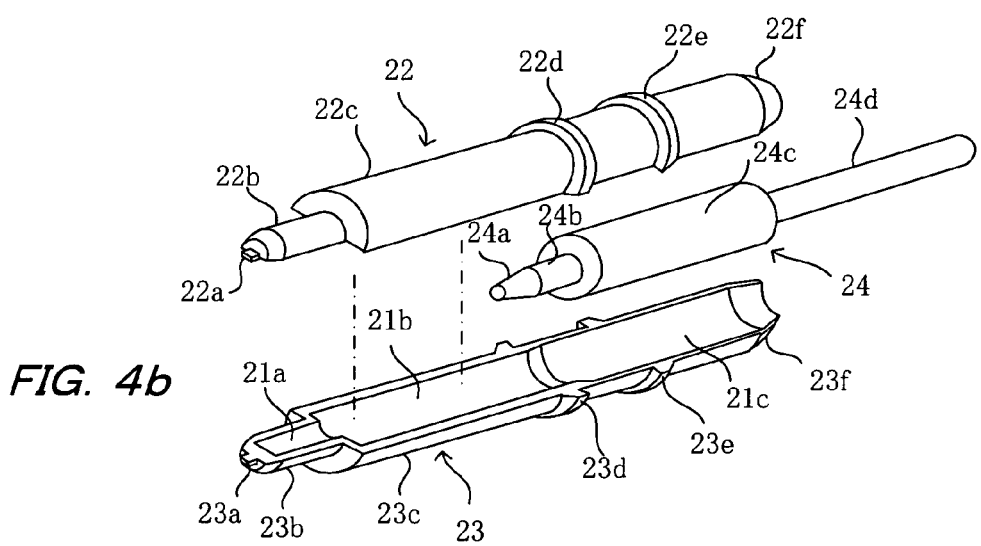
FIG. 4b is a perspective view of the linking tool, as viewed when it is disassembled.
Figure 4C:
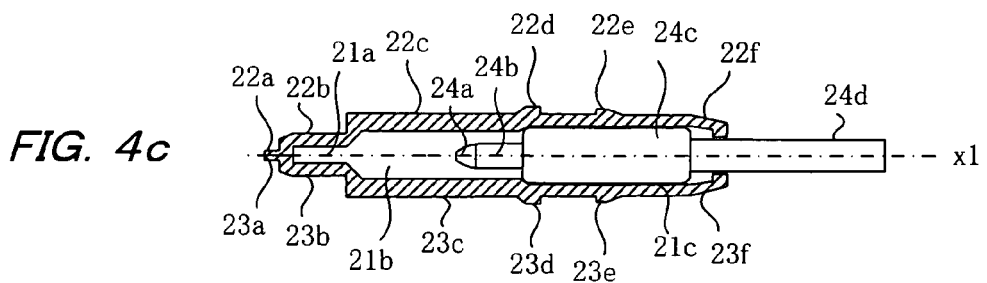
FIG. 4c is a vertical cross-sectional view of the linking tool.
Figure 5A:
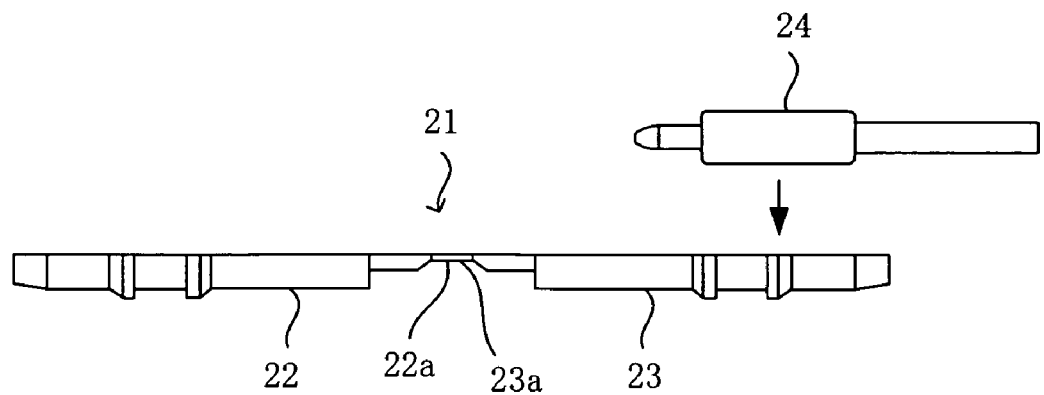
FIG. 5a is a lateral view of the linking tool in which linking pin halves have been spread apart horizontally.
Figure 5B:
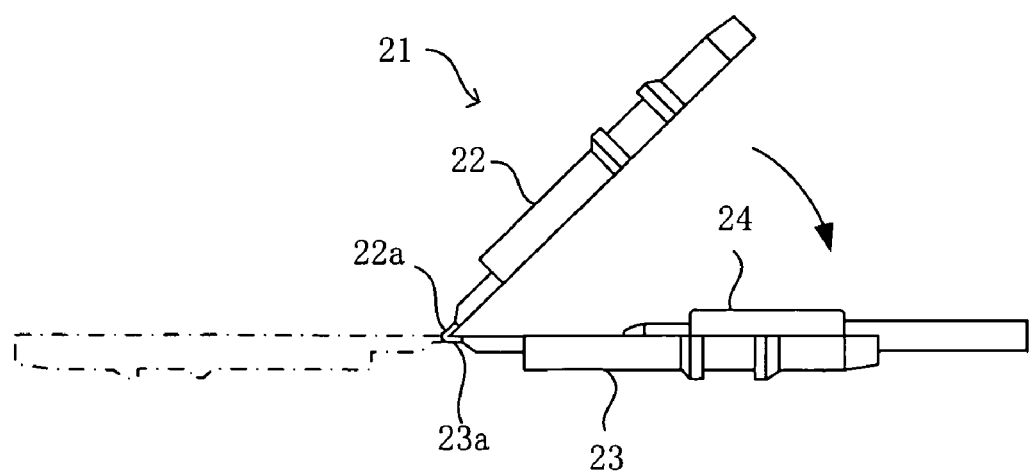
FIG. 5b is a lateral view of the linking tool showing a state in which the linking pin halves are folded together and overlaid.

A linking tool 20 for linking the segments 1 or the pipe units 10 in the longitudinal direction of the pipe is shown in FIGS. 4a through 4c and 5a, 5b. The linking tool 20 comprises a tubular hollow linking pin 21 and a separating pin 24. The linking pin has a hollow part constructed from overlaying linking pin halves 22, 23, and the separating pin separates the linking pin 21 into the linking pin halves 22, 23. The linking pin 21 has a shape formed integrally of plastic, in which the linking pin halves 22, 23 are linked by thin parts 22a, 23a, as shown in FIG. 5a. As shown in FIG. 5b, the linking pin 21 can be bent at the thin parts 22a, 23a and folded. The linking pin thereby becomes a tubular pin having a structure in which the linking pin halves 22, 23 are overlaid as shown in FIG. 4a.

As shown in FIGS. 4b, 4c, the linking pin half 22 has the thin part 22a that links to the linking pin half 23; a half-pipe part 22c having a shape obtained when the portion of a circular tube above a pipe axis x1 is cut off in the horizontal direction; a projecting part 22b that has a half-pipe shape having a small diameter and that projects farther toward the distal end than the half-pipe part 22c; a first protruding part 22d and a second protruding part 22e that extend in the circumferential direction over the outer circumferential surface of the half-pipe part 22c; and a slanted part 22f. The mutually facing surfaces of the first and second protruding parts 22d and 22e are vertical, while the opposite portions thereof are slanted and are continuous with the half-pipe part 22c.

The linking pin half 23 is shaped to be laterally symmetric with the linking pin half 22 when viewed as in FIG. 5a. The linking pin half 23 has the thin part 23a, a projecting part 23b, a half-pipe part 23c, a first protruding part 23d, a second protruding part 23e, and a slanted part 23f that correspond respectively to the thin part 22a, the projecting part 22b, the half-pipe part 22c, the first protruding part 22d, the second protruding part 22e, and the slanted part 22f of the linking pin half 22.

The linking pin halves 22, 23 have shapes that would result from horizontally cutting off a circular tube a predetermined small distance above (or below) a horizontal plane that passes through the central axis of the circular tube. The moderately flat, tubular linking pin 21, which has an ellipsoid cross section, is therefore obtained when the linking pin halves 22, 23 are overlaid as shown in FIG. 4a.

As shown in FIG. 4c, when the linking pin halves 22, 23 are overlaid, a hollow part 21a having a small diameter and a hollow part 21b having a larger diameter are formed on the inside of the linking pin. The thickness of the linking pin halves 22, 23 decreases beyond the first protruding parts 22d, 23d toward the end (the right side) of the linking pin. A hollow part 21c having a larger diameter than the hollow part 21b is therefore formed.

The separating pin 24 is a cylindrical pin of plastic or metal and has a conical distal part 24a, a cylindrical distal part 24b, a cylindrical center part 24c, and a cylindrical proximal part 24d.

Figure 6:
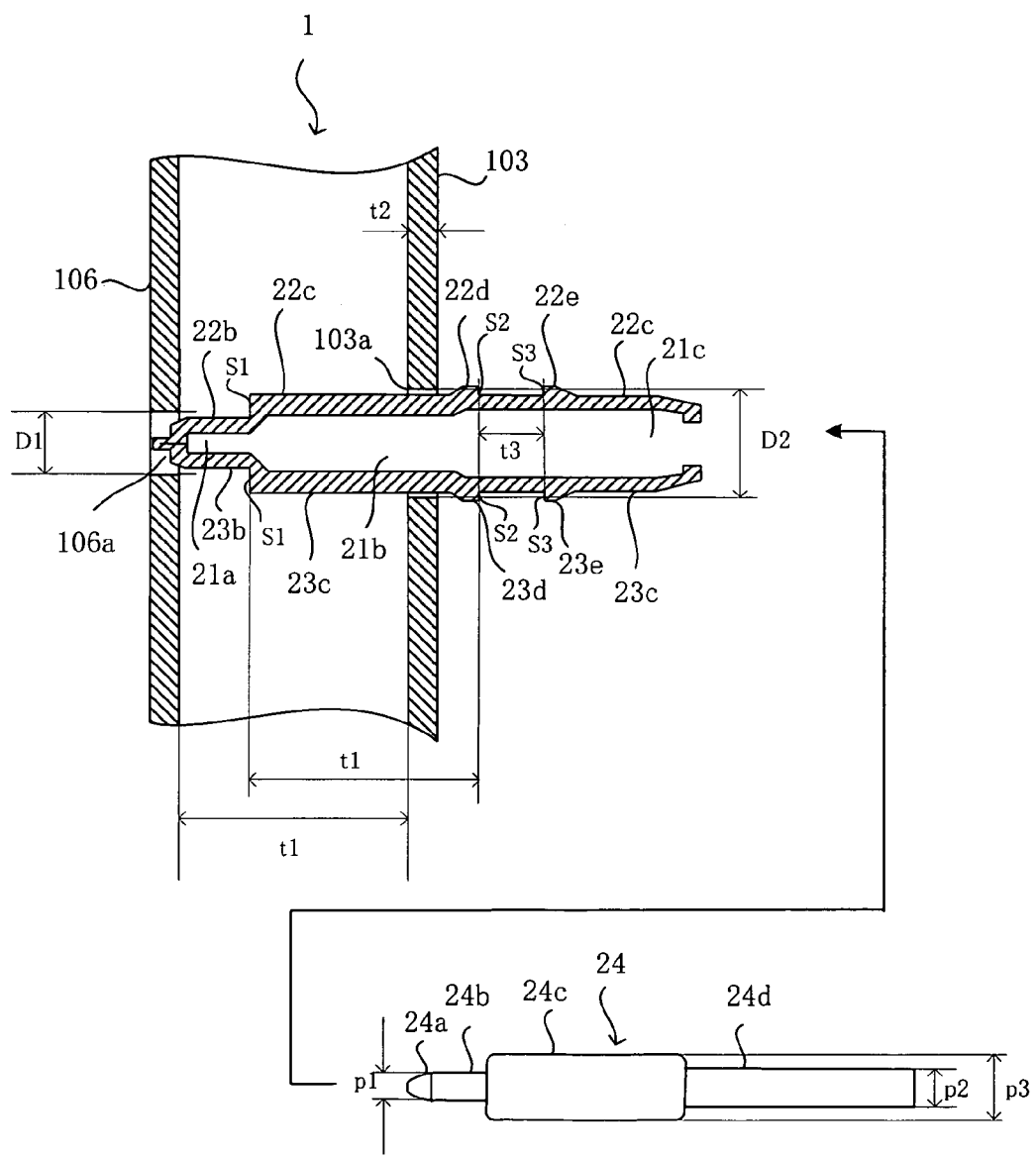
FIG. 6 is a cross-sectional view showing the dimensions of the linking pin, the separating pin, the side plate of the segment, and the internal plate thereof.

The dimensions of the segment 1, the separating pin 24, and the linking pin 21 obtained when the linking pin halves 22, 23 are overlaid are shown in FIG. 6.

A diameter D2 of the circular insertion hole 103a formed in the side plate 103 of the segment 1 is larger than a diameter D1 of the circular insertion hole 106a of the internal plate 106 adjoining the side plate 103. The size of the linking pin 21 allows the projecting parts 22b, 23b of the linking pin to pass through the insertion hole 106a of the internal plate 106 with a predetermined spacing, and allows the half-pipe parts 22c, 23c to pass through the insertion hole 103a of the side plate 103 with a substantially identical spacing. The first protruding parts 22d, 23d of the linking pin 21 are slanted on the inserting side (the left side) and protrude outwardly so high as to be able to pass through the insertion hole 103a due to its elasticity if forcefully pressed. The second protruding parts 22e, 23e of the linking pin 21 are also of an identical size and have lateral symmetry with the first protruding parts 22d, 23d.

A distance t1 from a boundary surface S1 between the projecting parts 22b, 23b and the half-pipe parts 22c, 23c of the linking pin 21 to a vertical surface S2 of the first protruding parts 22d, 23d is approximately equal to the distance between the opposing surfaces of the side plate 103 and the internal plate 106 of the segment 1. A distance t3 between opposing vertical surfaces S2, S3 of the first protruding parts 22d, 23d and the second protruding parts 22e, 23e is approximately double a thickness t2 of the side plate 103 (or the side plate 102) of the segment 1 in the longitudinal direction of the pipe.

The outside diameters of the distal part 24b, the center part 24c, and the proximal part 24d of the separating pin 24 are p1, p3, and p2, respectively, where p3>p2>p1.

When the linking pin halves 22, 23 are in an overlaid state, the size of the center part 24c of the separating pin 24 allows the center part to be housed in the hollow part 21c of the linking pin 21 but does not allow insertion into the hollow part 21b. The size of the distal part 24b of the separating pin 24 also prevents insertion into the hollow part 21a of the linking pin 21. However, when pressure is applied and the separating pin 24 is pushed in, the center part 24c of the separating pin 24 is pressed into the hollow part 21b of the linking pin 21, and the size of the distal part 24b of the separating pin 24 now allows the separating pin to be pressed into the hollow part 21a of the linking pin 21. When the center part 24c of the separating pin 24 is pressed into the hollow part 21b of the linking pin 21, and the distal part 24b of the separating pin 24 is pressed into the hollow part 21a of the linking pin 21, the linking pin 21 is pushed apart, and the joining parts 22a, 23a of the linking pin 21 are split. This causes the linking pin 21 to be separated into the linking pin halves 22, 23. The separated linking pin halves 22, 23 are pressed against the insertion holes 103a, 106a of the side plate 103 and the internal plate 106 of the segment 1 by the separating pin 24.

A method for linking segments in the longitudinal direction of the pipe using a linking tool configured in this manner will be described next.

Figure 7A:
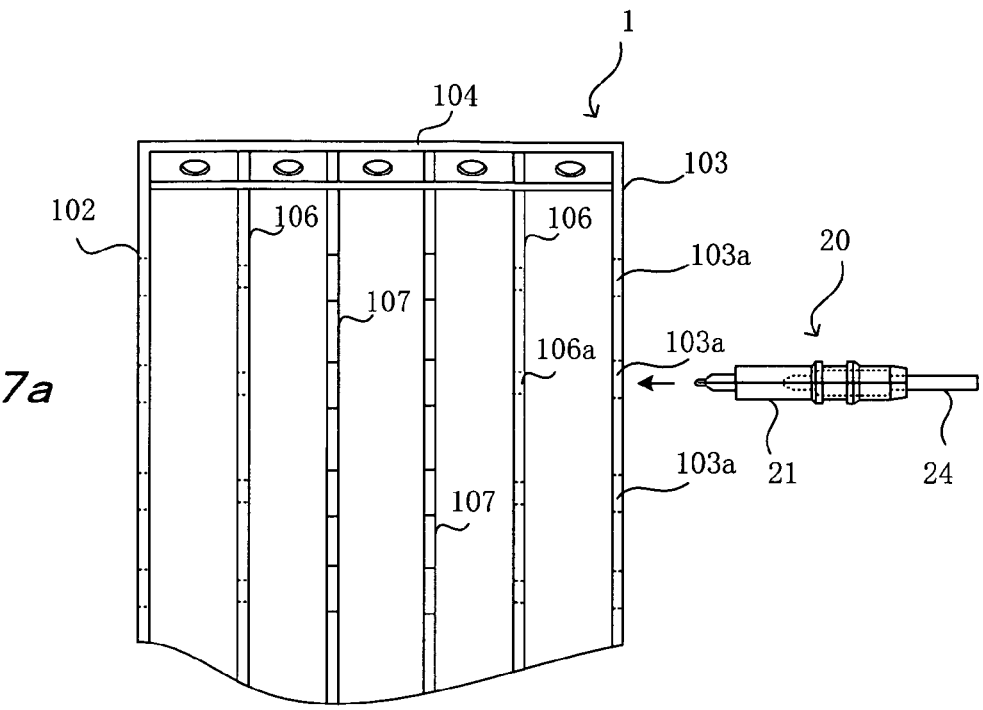
FIG. 7a is a plan view showing a state in which the linking tool is ready for insertion into a segment.

With the linking pin halves 22, 23 overlaid and the separating pin 24 housed inside the linking pin 21, as shown in FIGS. 4a, 4c, the linking pin 21 is inserted into an insertion hole 103a in the side plate 103 of the segment 1, as shown in FIG. 7a.

Figure 8A:
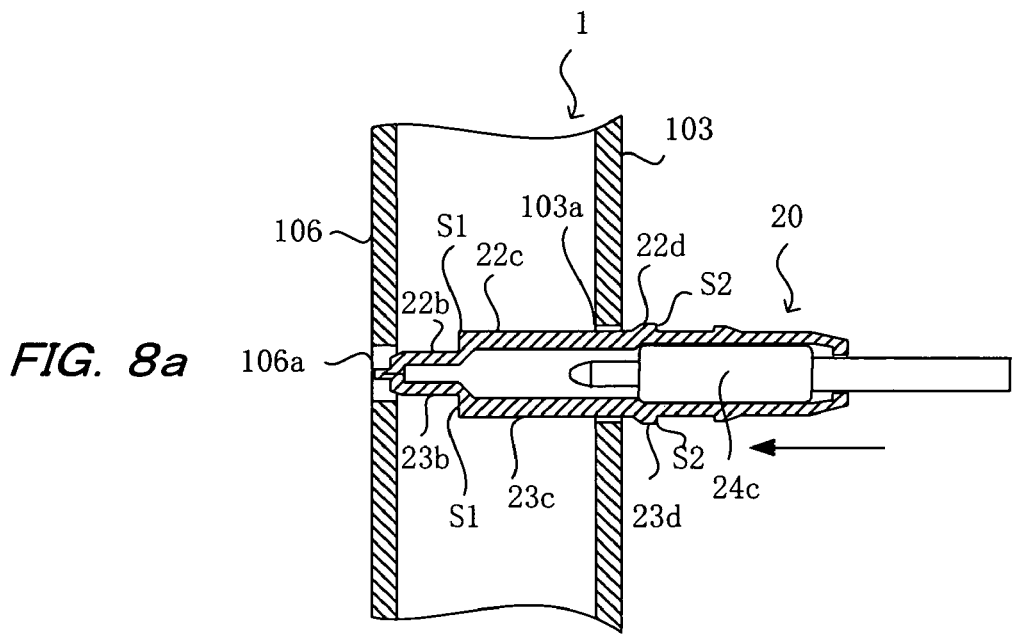
FIG. 8a is a cross-sectional view in which the linking pin is inserted to the forward part of the internal plate of the segment.
Figure 8B:
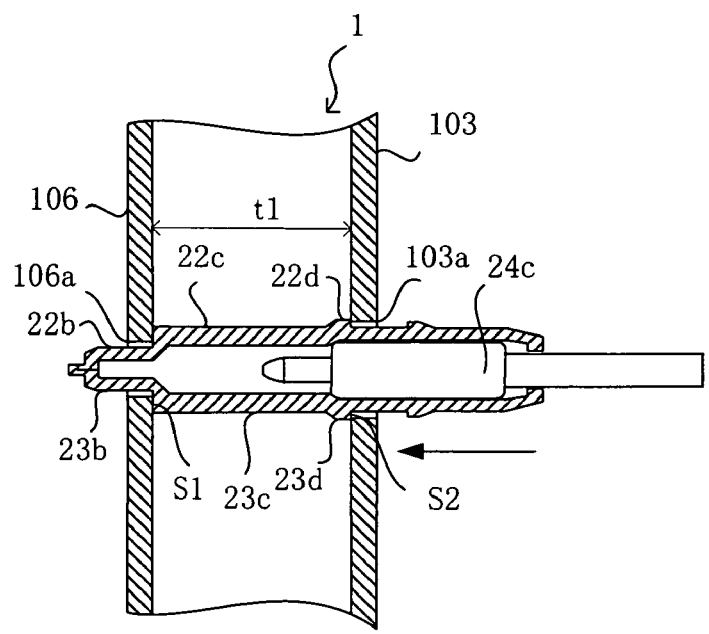
FIG. 8b is a cross-sectional view in which the linking pin is inserted to the insertion hole of the internal plate of the segment.

The half-pipe parts 22c, 23c of the linking pin 21 can pass through the insertion hole 103a of the side plate 103 of the segment 1, and the projecting parts 22b, 23b can pass through the insertion hole 106a of the internal plate 106. The linking pin 21 is therefore inserted into the insertion holes 103a, 106a with a predetermined spacing, as shown in FIG. 8a. The insertion sides (the left side) of the first protruding parts 22d, 23d of the linking pin 21 are slanted, and therefore, if the separating pin 24 is forcefully pushed, the first protruding parts 22d, 23d will pass through the insertion hole 103a due to the elasticity of the linking pin 21, as shown in FIG. 8b. The distance t1 from the boundary surface S1 between the projecting parts 22b, 23b and the half-pipe parts 22c, 23c to the vertical surface S2 of the first protruding parts 22d, 23d is equal to the distance between the opposing surfaces of the side plate 103 and the internal plate 106. The boundary surface S1 therefore contacts the inside surface of the internal plate 106, and the vertical surface S2 contacts the inside surface of the side plate 103.

Figure 7B:
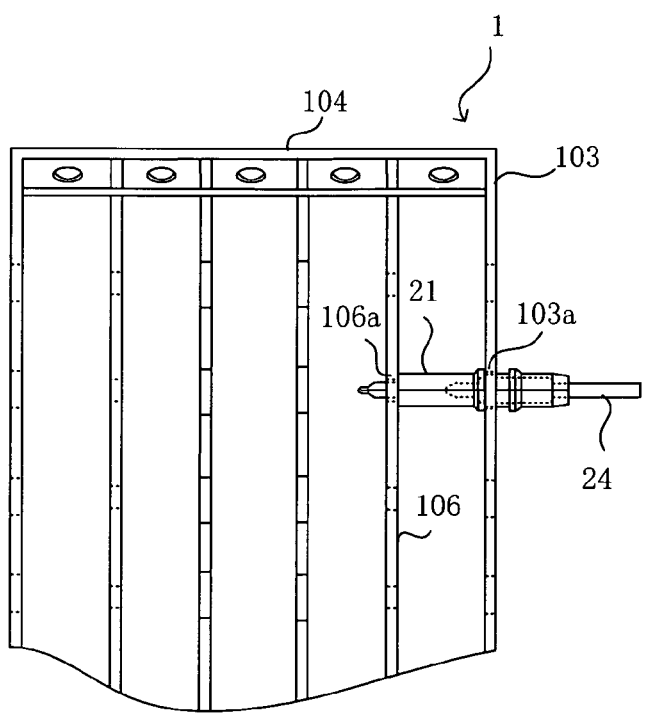
FIG. 7b is a plan view in which the linking tool is inserted and anchored to the segment.
Figure 8C:
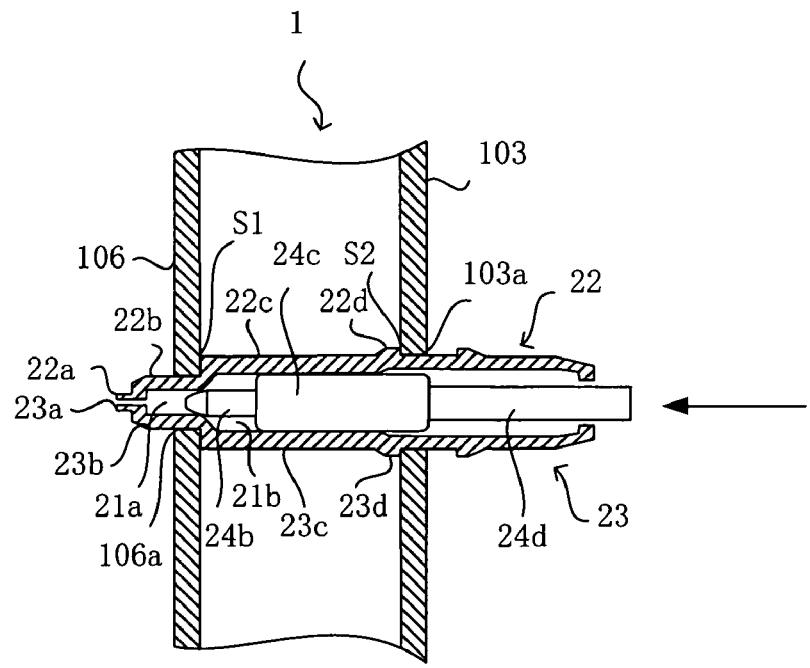
FIG. 8c is a cross-sectional view showing a state in which the separating pin is pressed in, and the linking pin is separated into the linking pin halves.
Figure 8D:
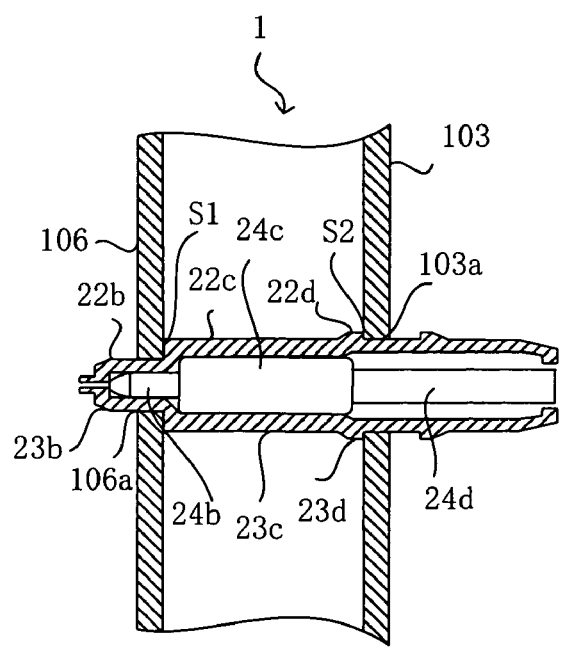

As shown in FIGS. 8c, 8d, when the proximal part 24d of the separating pin 24 is pushed in, the center part 24c of the separating pin 24 is pressed into the hollow part 21b of the linking pin 21, and the distal part 24b of the separating pin 24 is pressed into the hollow part 21a of the linking pin 21. The linking parts 22a, 23a are then split, and the linking pin 21 is separated into the linking pin halves 22, 23. The separated linking pin halves 22, 23 are thus pushed apart by the separating pin 24, the projecting parts 22b, 23b of the linking pin 21 are pressed against the insertion hole 106a of the internal plate 106, and the half-pipe parts 22c, 23c thereof are pressed against the insertion hole 103a of the side plate 103. The linking pin is thereby anchored to the segment 1. The boundary surface S1 of the half-pipe parts 22c, 23c is pressed against the inside surface of the internal plate 106 at this point, and the vertical surface S2 of the first protruding parts 22d, 23d is pressed against the inside surface of the side plate 103. The linking pin 21 is therefore reliably anchored to the segment 1, and the linking pin 21 can be prevented from passing back through the insertion hole 103a of the side plate 103 of the segment 1 and detaching therefrom. This state is also shown in FIG. 7b.

Figure 8E:
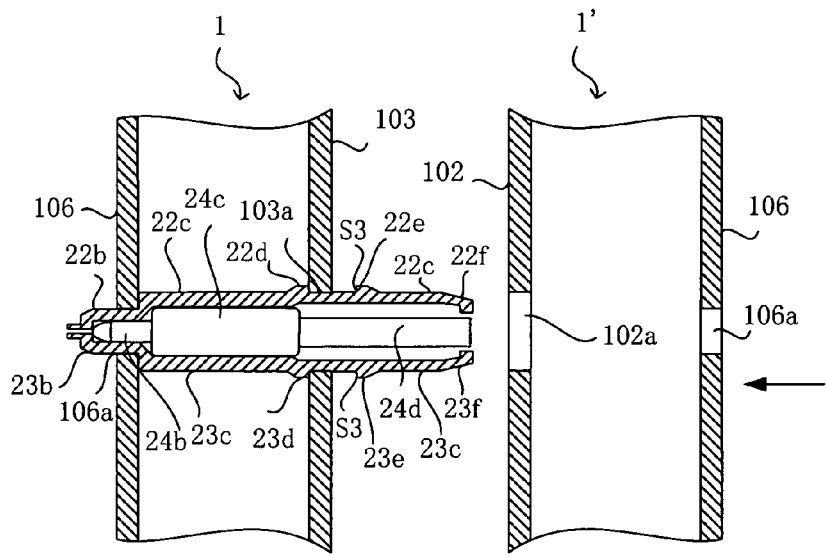
FIG. 8e is a cross-sectional view in which the linking pin is pushed into the insertion hole of the side plate of another segment.
Figure 8F:
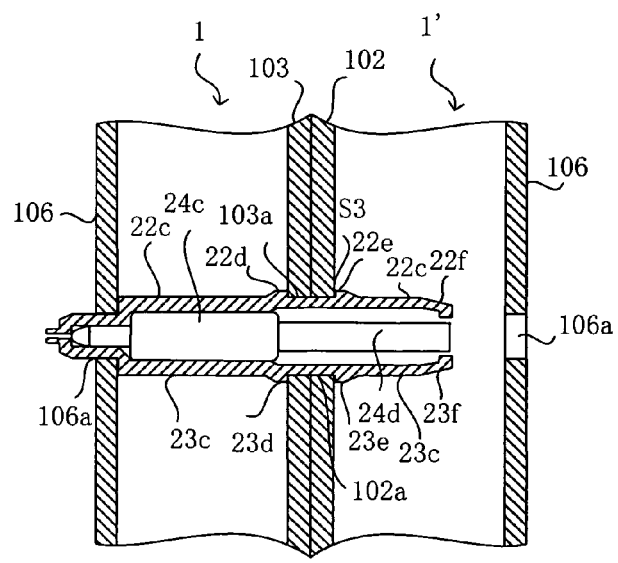
FIG. 8f is a cross-sectional view in which two segments have been linked by the linking pin.

Next, as shown in FIGS. 8e and 8f, the end opposite the inserted end of the linking pin 21, which has been separated into the linking pin halves 22, 23, is inserted into the insertion hole 102a of the side plate 102 of another segment 1'. The linking pin halves 22, 23 are separated and flex to the inside, and are therefore readily inserted. The side plate 102 slides over the slanted surfaces of the second protruding parts 22e, 23e, and the side plate 102 of the segment 1' and the linking pin 21 are snapped together and anchored. The distance between the opposing vertical surfaces S2, S3 of the first protruding parts and the second protruding parts is approximately twice the thickness of the side plate 103 (102), and therefore the side plate 102 of the segment 1' is anchored in a state of being pressed between the vertical surface S3 of the second protruding parts 22e, 23e and the side plate 103 of the segment 1. The segment 1' is prevented from detaching from the linking pin 21 by the second protruding parts 22e, 23e. The segment 1' is thus anchored to the segment 1 by the linking pin 21, and therefore the segments 1 and 1' can be firmly linked in the longitudinal direction of the pipe.

Figure 9A:
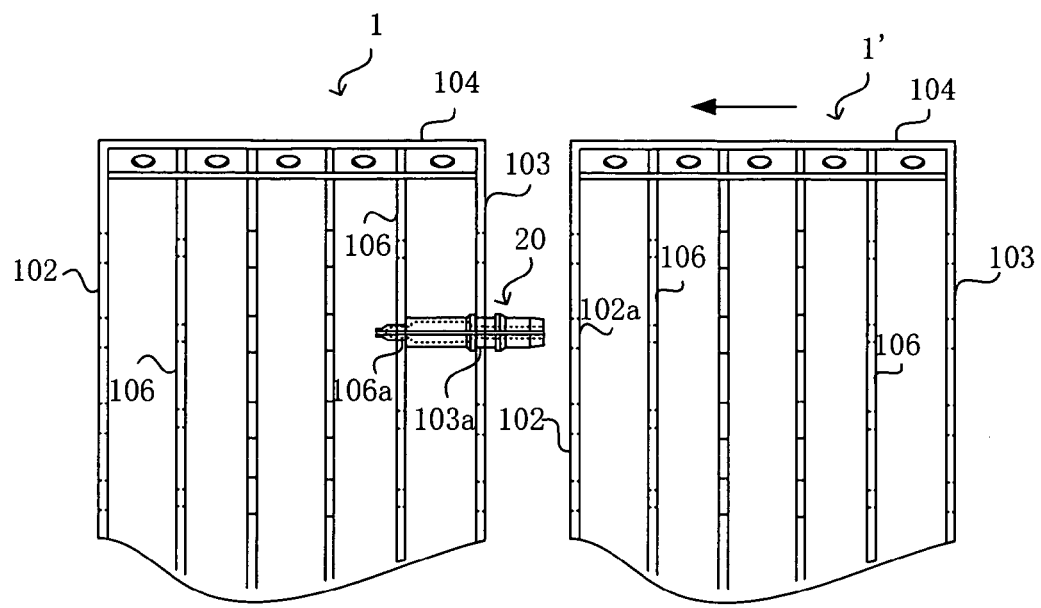
FIG. 9a is a plan view in which two segments are being linked by the linking pin.
Figure 9B:
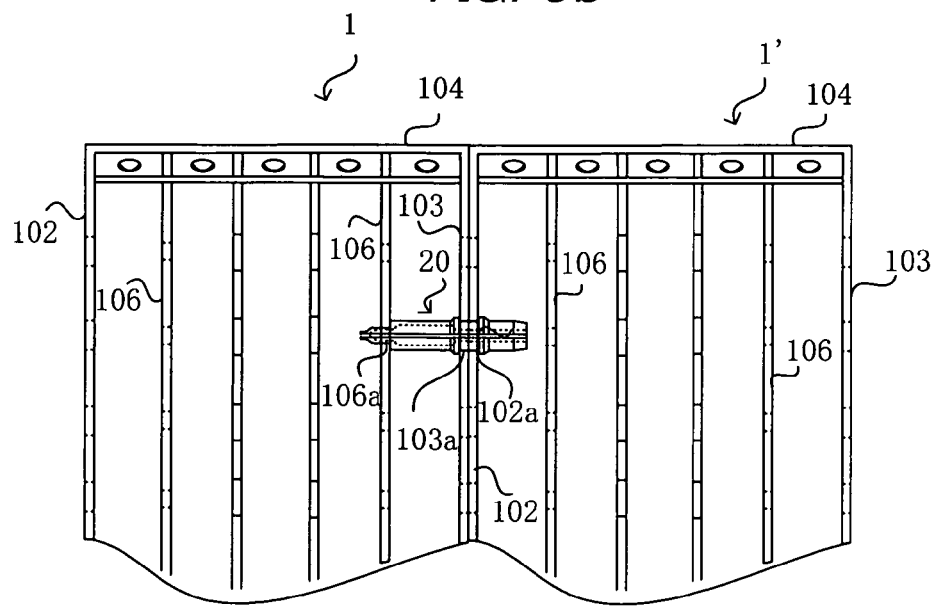
FIG. 9b is a plan view in which both segments have been linked.

FIGS. 9a, 9b show the linkage of the segments 1, 1' via the linking tool 20 as viewed from above.

The cross-section of the linking pin can be made into a hexagonal or other polygonal shape instead of a tubular shape. The shapes of the insertion holes of the internal plates and the side plates of the segments are formed accordingly in such instances. The first and second protruding parts of the linking pin may also be formed around the entirety of the linking pin in the circumferential direction or may be formed intermittently in the circumferential direction.

A plurality of the insertion holes (102a, 103a, 106a) for the linking tool of the segments is formed along the circumferential direction of the side plates and the internal plates, as shown in FIG. 1. The linking tool 20 is therefore inserted into a predetermined number of the plurality of the insertion holes, and the segments are linked in the longitudinal direction of the pipe by the linking tools. However, the linking tools 20 that link the segments are short, and therefore the linkage is weak. A linking rod that extends along the width of the segment in the longitudinal direction of the pipe is therefore inserted into the insertion hole of the segment, and one end of the linking rod is joined to the other end of a linking rod that has already been anchored to another segment, as disclosed in Japanese Laid-open Patent Application No. 2005-299711. The linking rod is thereby affixed to the segment, and the segment is thereby linked to another segment in the longitudinal direction of the pipe via the linking rod. This state is shown in FIG. 10.

Segments 1, 1', 1" are partially linked via the linking tools 20 in FIG. 10. A metal anchoring nut 32 is inserted into the side plate 103 of the segment 1 and the side plate 102 of the segment 1'. A metal bolt 33 is screwed through the internal plates 106 of the segment 1 into the anchoring nut 32, whereby the anchoring nut 32 is anchored to the segment 1.

An axle part 31b of a metal linking rod 31 that extends across both of the side plates 102, 103 of the segment has a screw part 31a on one end and a nut part 31c, which has a screw 31d on the inside, on the other end.

The linking rod 31 is passed through the insertion holes of the side plates and the internal plates of the segment 1', and the portion of the nut part 31c that juts out from the side plate 103 of the segment 1' is rotated, whereby the screw part 31a of the linking rod 31 is screwed into the anchoring nut 32. The linking rod 31 is screwed in until the end of the nut part 31c on the insertion side presses against the internal plate 106. This causes the linking rod 31 to be anchored to the segment 1', and the segment 1' is linked and fastened to the segment 1 by the linking rod 31. The nut part 31c of the linking rod 31 of the segment 1' performs the function of the anchoring nut 32 affixed to the segment 1, and therefore the segment 1" can be linked to the segment 1' using another linking rod 31 in the same manner. A plurality of the segments can be sequentially linked in the longitudinal direction of the pipe via the linking rods by repetition of the same procedure.

A method for rehabilitating an existing pipeline using the segments will be described below.

Figure 11:
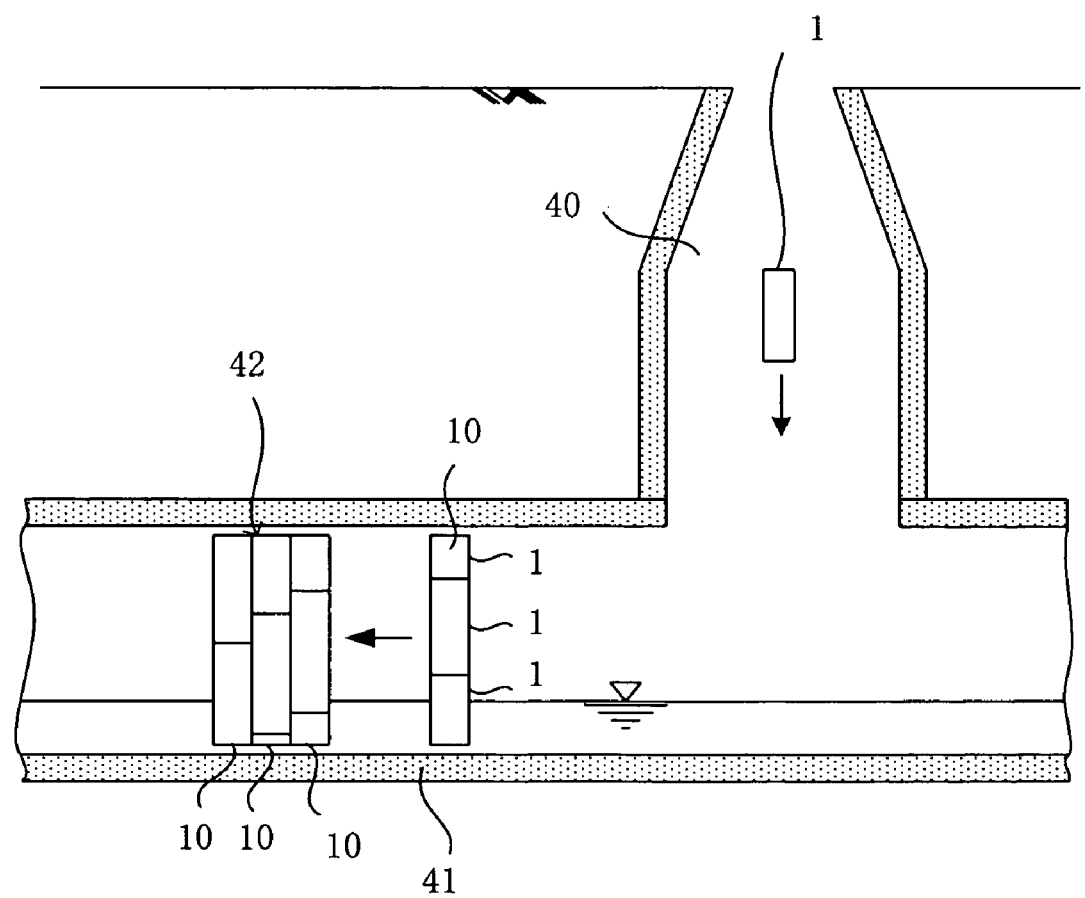
FIG. 11 is an illustrative view showing a state in which a rehabilitating pipe composed of the segments is laid in an existing pipeline.

The segments 1 are first transported into an existing pipeline 41 via a manhole 40, as shown in FIG. 11. The segments 1 are then sequentially linked in the circumferential direction to assemble the pipe units 10, as shown in FIG. 3.

The pipe units 10 are assembled in the same manner and then linked to previously assembled pipe units 10 in the longitudinal direction of the pipe. The pipe units 10 are linked by linking the segments 1 of the pipe units 10 using the above-mentioned linking tools 20 and/or linking rods 31.

Figure 12:
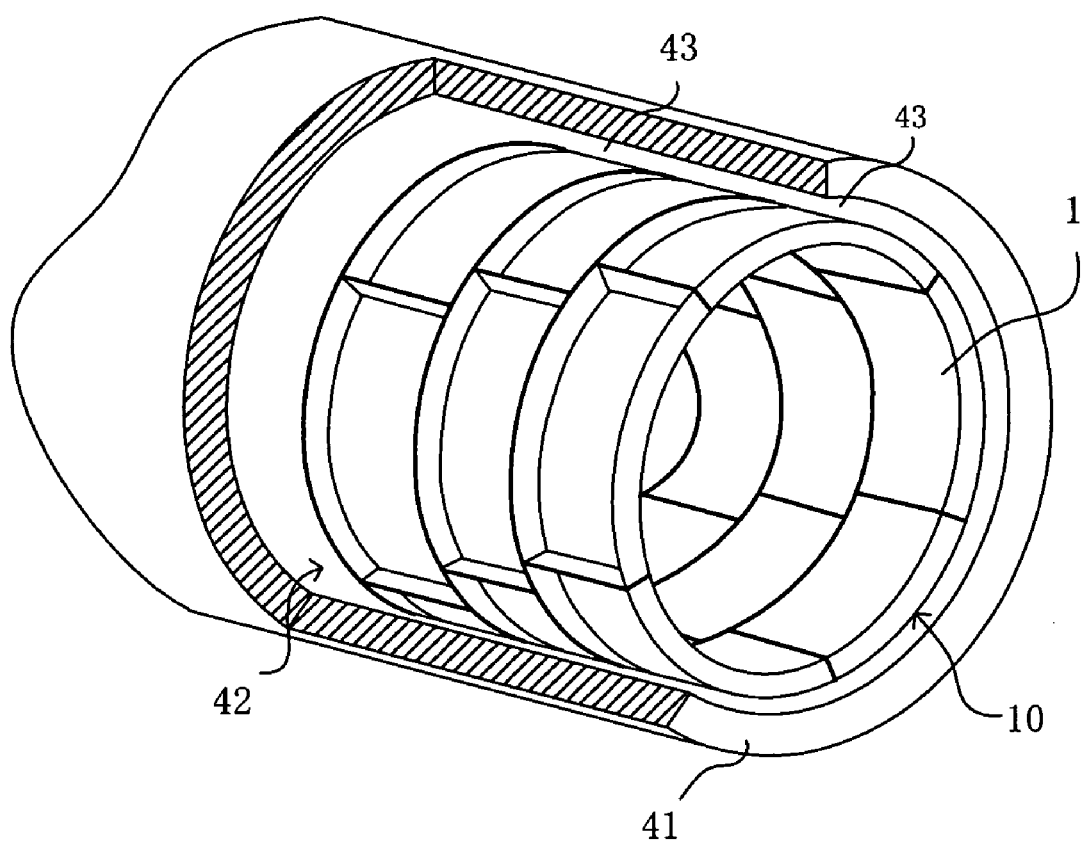
FIG. 12 is a perspective view showing the exterior of the rehabilitating pipe laid within the existing pipeline.

The pipe units 10 are sequentially linked in the longitudinal direction of the pipe inside the existing pipeline 41 as described above, whereby a rehabilitating pipe 42 can be laid inside the existing pipeline 41. This state is shown in FIG. 12. As in FIG. 3, only the essential components are shown in FIG. 12. The linking tools, linking rods, and other means for linking in the longitudinal direction of the pipe or in the circumferential direction have been omitted in order to avoid complexity.

A gap 43 is present between the outer circumferential surface of the rehabilitating pipe 42 and the inner-wall surface of the existing pipeline 41. A grouting material or other filler is therefore poured into the gap 43 to make the rehabilitating pipe 42 and the existing pipeline 41 integrated. The assembly of the pipe unit 10 in the present embodiment is such that the end plates of the segments thereof are offset from the end plates of the segments in other pipe units, but the assembly may also be such that the respective end plates are aligned. FIG. 9 shows an example of an assembly in which the end plates of the segments are aligned.

What is claimed is:

1. A method for linking segments for a rehabilitating pipe for rehabilitating an existing pipeline, the segment being integrally formed at least from an internal surface plate that constitutes the inner circumferential surface of the rehabilitating pipe, and side plates that have an insertion hole formed thereon and are disposed on both sides of the internal surface plate so as to extend in the circumferential direction of the rehabilitating pipe, the method for linking the segments comprising the steps of:

preparing a linking pin that can be separated into pin halves by a separating pin;

inserting the linking pin into the insertion hole in the side plate of a first segment with a part of the linking pin remaining outside the first segment;

separating the linking pin into the pin halves by the separating pin, the separated pin halves being pressed against the first segment, thereby anchoring the pin halves to the first segment; and snap-fitting the pin halves remaining outside the first segment into a second segment through the insertion hole of the side plate thereof, thereby linking the first and second segments in the longitudinal direction of the rehabilitating pipe.

2. A method for linking segments for a rehabilitating pipe according to claim 1, wherein a plurality of insertion holes are formed in the side plates of the first and second segments, and the linking pin is inserted into a predetermined number of insertion holes among the plurality of insertion holes to link the first and second segments in the longitudinal direction of the rehabilitating pipe.

3. A method for linking segments for a rehabilitating pipe according to claim 2, wherein a linking rod extending across the width of the segment is inserted to the insertion hole to link the first and second segments in the longitudinal direction,of the rehabilitating pipe.

4. A linking tool for linking segments for a rehabilitating pipe for rehabilitating an existing pipeline, the segment being integrally formed at least from an internal surface plate that constitutes the inner circumferential surface of the rehabilitating pipe, and side plates that have an insertion hole formed thereon and are disposed on both sides of the internal surface plate so as to extend in the circumferential direction of the rehabilitating pipe, the linking tool comprising:

a tubular linking pin that is separable into pin halves and can be inserted into the insertion hole in the side plate of a first segment with a part of the linking pin remaining outside the first segment; and a separating pin that can be inserted into the tubular linking pin to separate the linking pin into the pin halves and press them against the first segment for anchoring thereto;

wherein the pin halves remaining outside the first segment are snap-fitted into a second segment through the insertion hole of the side plate thereof, thereby linking the first and second segments in the longitudinal direction of the rehabilitating pipe.

5. A linking tool according to claim 4, wherein the linking pin has a first large-diameter protruding part that can pass through the insertion hole of the side plate of the first segment in the insertion direction, but can be prevented from passing back once passing therethrough, and a second large-diameter protruding part that can pass through the insertion hole of the side plate of the second segment in the insertion direction, but can be prevented from passing back once passing therethrough, the distance between the first and second protruding parts being substantially equal to twice the thickness of the side plate of the segments.

6. A linking tool according to claim 5, wherein the linking pin has a small-diameter part on a distal end that can be inserted into an insertion hole in an internal plate provided inside the side plate of the first segment, the distance between the proximal end of the small-diameter part and the first protruding part being substantially equal to the distance between the internal and side plates of the first segment.

7. A linking tool according to claim 4, wherein the liking pin is constructed so as to accommodate the separating pin.

8. A linking tool according to claim 4, wherein the first and second protruding parts are flat in opposing surfaces and slant in the other surfaces.

9. A linking tool according to claim 4, wherein the first and second protruding parts are formed across the entirety of the circumferential direction of the linking pin.

10. A linking tool according to claim 4, wherein the pin halves are separatably linked by an insertion-side end part.

* * * * *